July 12, 1966          D. H. SANDERS          3,260,239
APPARATUS FOR SHIPPING LIVE BIRDS
Filed Oct. 21, 1964          3 Sheets-Sheet 1
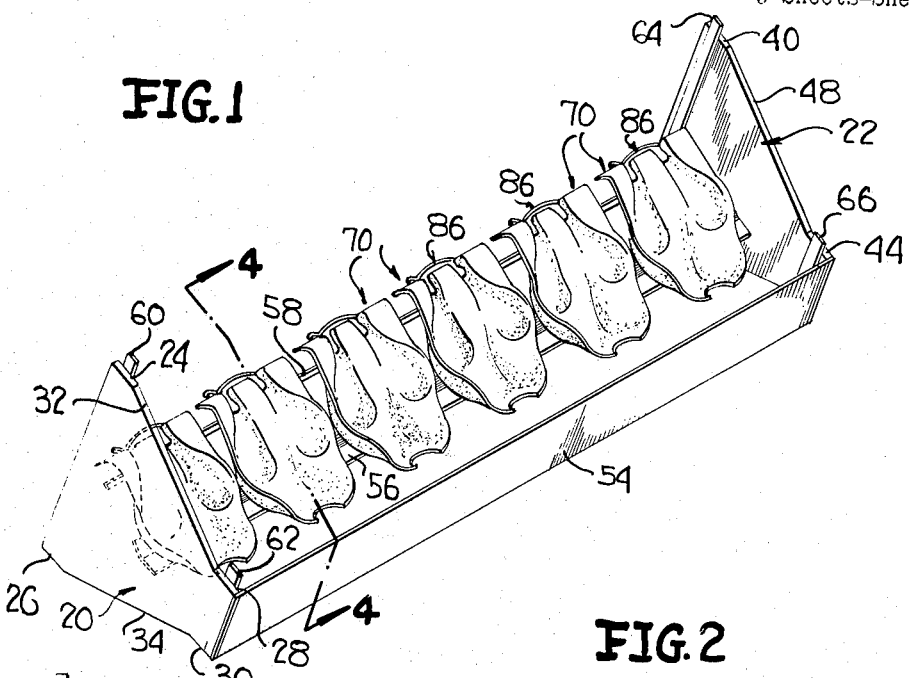
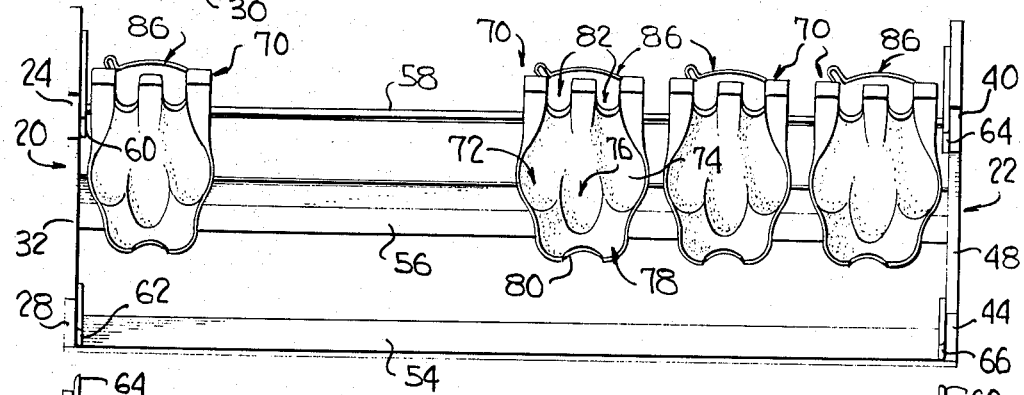
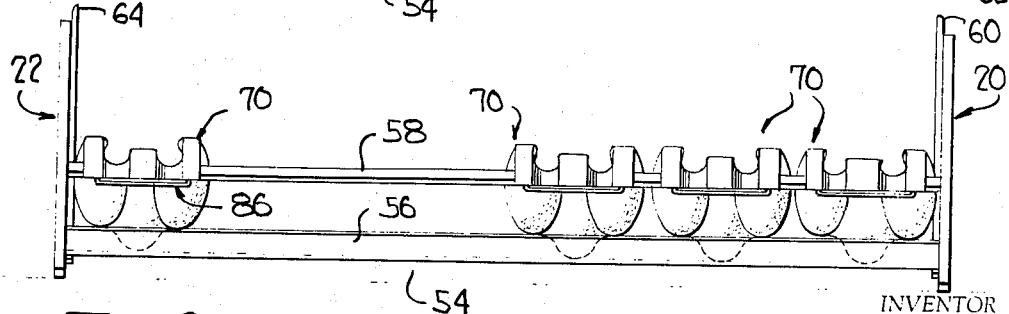
INVENTOR
DICKERSON H. SANDERS
BY *Shoemaker and Mattare*
ATTORNEYS

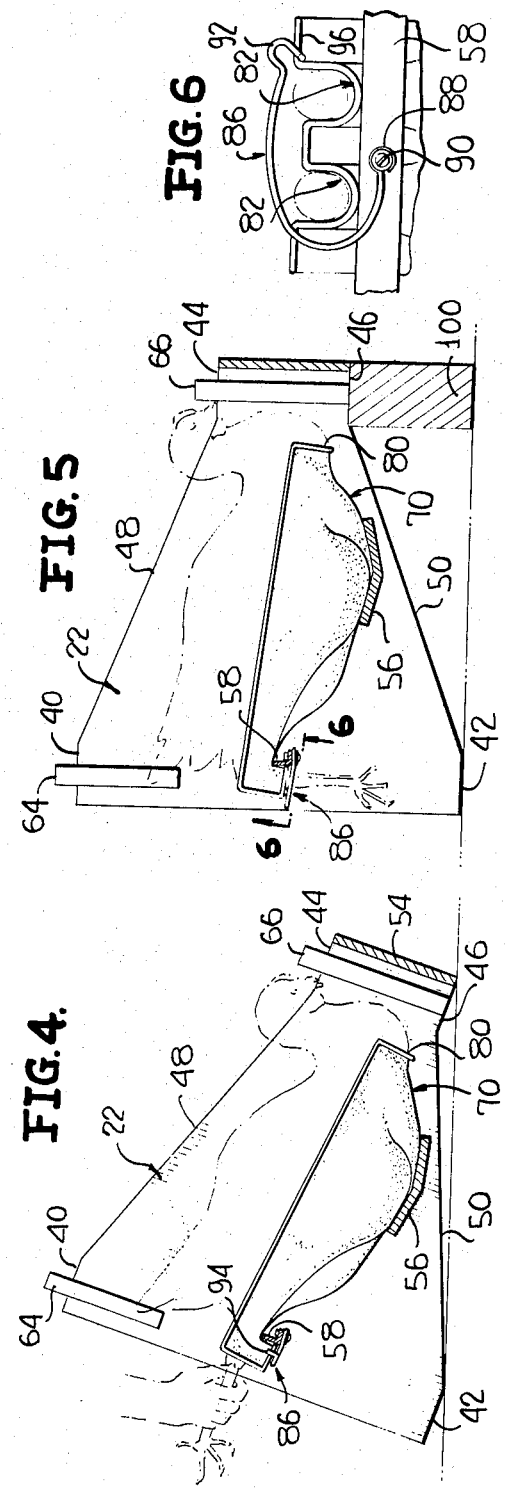
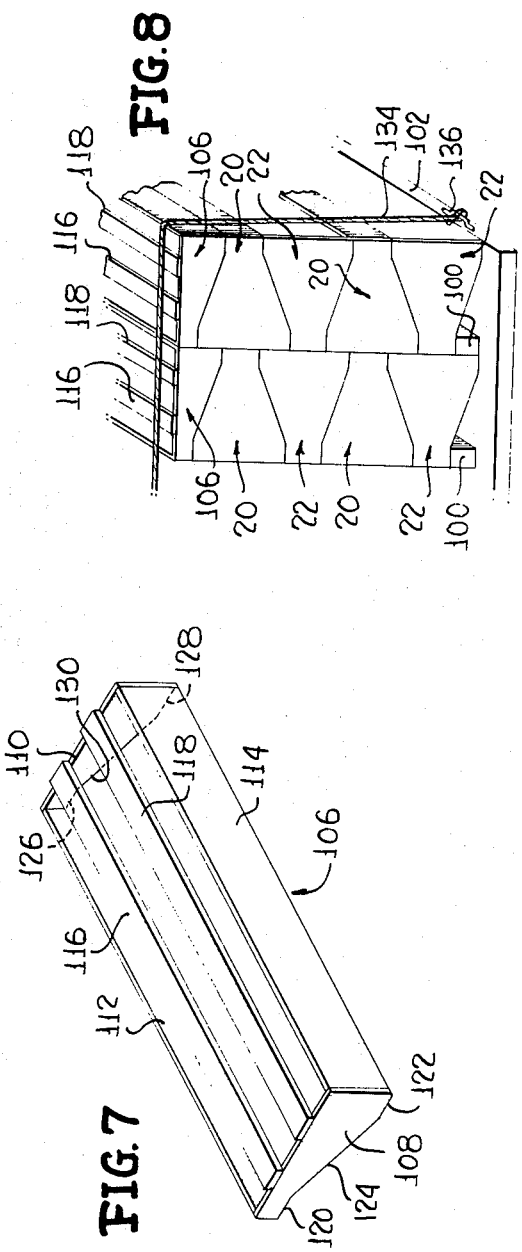

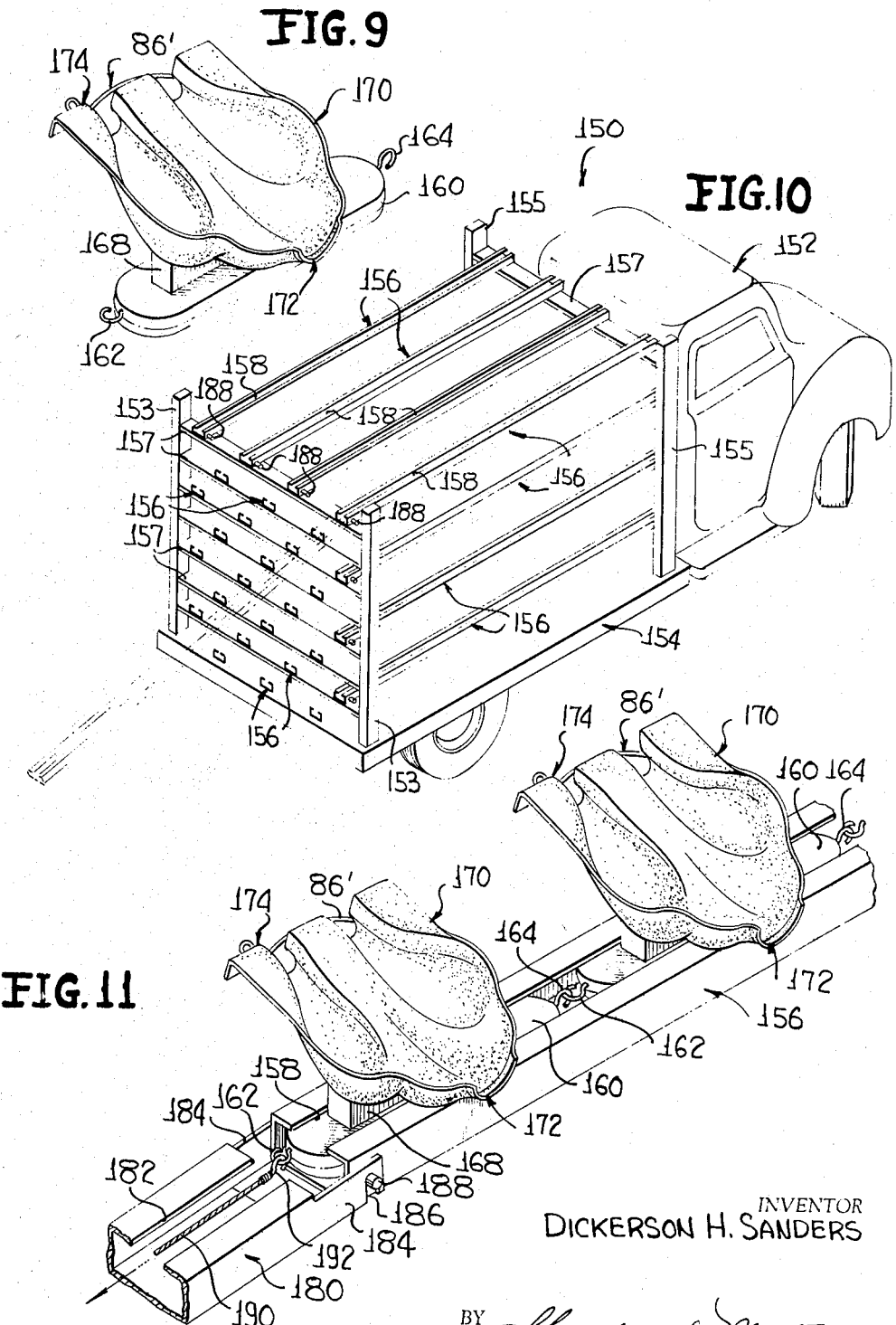

3,260,239
APPARATUS FOR SHIPPING LIVE BIRDS
Dickerson H. Sanders, Laurel, Md.
(55 Jefferson Circle, Athens, Ga. 30601)
Filed Oct. 21, 1964, Ser. No. 405,354
16 Claims. (Cl. 119—97)

The present invention relates to new and novel apparatus for shipping live birds, and more particularly to an arrangement for shipping birds such as chickens from the field to a processing plant or the like.

When shipping birds to a processing plant, a major consideration is the prevention of bruising and damaging of the meat of the birds, such as chickens, since such damage to the meat results in a lower grade of meat which of course reduces the value of the meat as sold at retail prices.

While the present invention may of course be utilized with any type of bird or poultry, it is especially adapted for use in shipping chickens. It has been found as a matter of statistical fact that approximately 10 percent of the chickens shipped to processing plants are physically bruised and damaged during transport. In the prior art, the chickens are generally disposed within wooden coops which are of such a size as to receive a number of chickens all of which are unrestrained and free to move about within the coop.

This prior art arrangement has not proved to be satisfactory in actual use since there is nothing to retain the chickens in the desired spaced relationship within the coop, and the chickens are free to slide about within the coop. These coops are generally conveyed by means of trucks, and when these trucks are negotiating corners, the birds usually are thrown into one corner of the coop causing all of the weight of the various birds to be thrown against a bird which is jammed into the corner thereby frequently causing damage to this latter-mentioned bird.

The present invention represents an improvement over applicant's copending U.S. patent application Serial No. 353,890, filed March 23, 1964. The present invention employs a similar basic concept in that the birds are supported during shipment in such a manner as to minimize any physical damage to the birds. This is accomplished by supporting the birds on individual support means in spaced relation to one another and in such a position as to cause the birds to be substantially immobile while being shipped.

Advantage is taken of the well known fact that a chicken, for example, if held in a position such that it is sloping downwardly with its head below horizontal and with its clavicle resting against some sort of support means will instinctively pull its feet up under it and will remain virtually motionless as long as there is any movement whatsoever of the container within which the bird is positioned or of the truck on which the container is supported.

The support means of the present invention is contoured so as to be substantially complementary to the shape of the underside of the bird and furthermore it engages a major large area of the underside of the bird so as to prevent localized contact therewith. This accordingly prevents any excessive rubbing or irritation of any particular part of the bird. In the aforementioned pending patent application there is disclosed an arrangement wherein the support means are pivotally mounted, and the present invention is particularly directed to a simplified arrangement wherein the support means may be permanently fixed with respect to the associated container and wherein the over-all structure is exceedingly simple and inexpensive.

The present invention also affords an arrangement whereby loading and unloading of the birds within the support means can be carried out in a very simple manner which is far superior to the arrangements now being employed in this field. The loading and unloading is carried out simply by grasping the legs of the bird and lifting the bird out of position, the bird being inserted in operative position simply by lowering it into place. This eliminates the rough handling of the birds which often occurs in present loading and unloading of the birds in conventional chicken coops, for example. The time involved in loading and unloading is reduced with the arrangement of the present invention and the number of personnel required is also less so as to substantially reduce the cost of such operations.

The container of the present invention comprises an open lightweight framework which is readily adapted to be stacked one upon another. A special advantage of this arrangement is the fact that very good vertical air circulation is permitted with the arrangement of the present invention when the containers are stacked one upon the other. When utilizing conventional chicken coops having solid bottoms, there is practically no air circulation in the middle of a stacked truck or vehicle, and accordingly it is necessary to use fans when the vehicle is parked in order to provide the necessary air to the birds in the middle of the stack. This is not necessary in the present invention since the completely open top and bottoms of the containers permit the air to readily circulate even in the middle of a large stack of containers.

The containers of the present invention may be constructed of fiberglass or sheet metal and other lightweight materials such as wood and the like and the over-all arrangement is such that the expected life span of a shipping container according to the present invention is substantially greater than that of a conventional wooden chicken coop. For example, whereas a prior art container ordinarily will last approximately 12 to 18 months in normal use, it is anticipated that a container according to the present invention should have a life expectancy of at least 3 years.

The container of the present invention also provides a very substantial saving in weight as compared to a comparable chicken coop. Whereas it is common in this field to employ coops which weigh approximately 1½ pounds per bird supported thereby, the container of the present invention provides an arrangement wherein the weight thereof is approximately 1 pound per bird. It is obvious that this provides a great saving in weight and reduces the over-all cost of the shipping operation.

An additional feature of the present invention is the fact that since the container provides a very compact arrangement and further enables various containers to be stacked upon one another in a reverse relationship to one another so as to nest together, the bird density per cubic foot of truck space is increased and accordingly the capacity of the shipping truck or vehicle is substantially increased providing a corresponding saving in shipping costs.

The container of the present invention is designed to be as lightweight and simple and inexpensive in construction as possible, and yet at the same time it is quite rugged and sturdy in order to withstand the rather rough use and abuse which commonly occurs to this type of shipping containers.

An object of the present invention is to provide new and novel apparatus for shipping live birds which supports the birds during shipping in such a manner as to minimize any physical damage thereto.

Another object of the invention is the provision of apparatus for shipping live birds which is so arranged as to facilitate loading as well as unloading of the apparatus thereby reducing the chance of physically damaging the birds and further minimizing the time and effort required to perform these operations.

Still another object of the invention is to provide apparatus for shipping live birds which holds the birds in such a position as to immobilize the birds during the shipping operation.

A still further object of the invention is the provision of apparatus for shipping live birds which is of such a construction as to provide improved air circulation in a stack of containers and to eliminate the necessity of providing fans for providing air circulation.

Still a further object of the invention is to provide apparatus for shipping live birds which will provide a greater life expectancy for the shipping container and which provides a substantial savings in weight.

Yet another object of the invention is the provision of apparatus for shipping live birds which permits greater bird density on a truck or vehicle to increase the capacity thereof.

Still another object of the invention is to provide apparatus for shipping live birds which is relatively lightweight, simple and inexpensive in construction, and yet which is quite rugged and sturdy and efficient and reliable in operation.

Yet a further object of the invention is to provide a novel transport vehicle for shipping live birds including means for permitting the live birds to be quickly and simply loaded and unloaded with respect to the vehicle.

Other objects and many attendant advantages of the invention will become more apparent when considered in connection with the specification and accompanying drawings, wherein:

FIG. 1 is a top perspective view of a shipping container according to the present invention;

FIG. 2 is a top view of the apparatus shown in FIG. 1;

FIG. 3 is a rear view of the apparatus shown in FIG. 1;

FIG. 4 is a sectional view taken substantially along line 4—4 of FIG. 1 looking in the direction of the arrows;

FIG. 5 is a view similar to FIG. 4 illustrating a leveling block in place beneath the forward end portion of the container;

FIG. 6 is a view taken substantially along line 6—6 of FIG. 5 looking in the direction of the arrows;

FIG. 7 is a top perspective view of a filler unit employed at the top of a stack of containers according to the present invention;

FIG. 8 illustrates two adjacent stacks of containers along with means for tying them down on the bed of a truck or the like;

FIG. 9 is a top perspective view of a bird support unit employed with a novel vehicle for transporting live birds according to the present invention;

FIG. 10 is a top perspective view of the novel vehicle for transporting live birds; and FIG. 11 is a top perspective view illustrating the manner in which the bird support units are supported upon the track means of the vehicle shown in FIG. 10.

Referring now to the drawings wherein like reference characters designate corresponding parts throughout the several views, there is shown in FIGS. 1–6 inclusive a shipping container according to the present invention wherein the container comprises an open lightweight framework including opposite end wall portions indicated generally by reference numerals 20 and 22. End wall portion 20 includes top and bottom relatively short parallel edges 24 and 26 adjacent the rear portion of the container, and a pair of relatively short parallel edges 28 and 30 are provided adjacent the forward end of the container. Edges 24 and 28 are joined by a sloping edge 32, and edges 26 and 30 are joined by a sloping edge 34. It will be noted that the edge portions 28 and 30 are spaced apart a distance which is substantially less than the distance which the edge portions 24 and 26 are spaced apart. The distance between edge portions 24 and 26 may be on the order of three times that of the distance between edge portions 28 and 30. It will be noted further that the edge portions 32 and 34 taper from the rear of the container toward the front of the container such that each end wall portion as viewed from an end of the container provides a generally tapered configuration from the back of the container to the front of the container. This tapered configuration saves space and permits stacking of the containers as hereinafter described.

The end wall portions are joined together by a plurality of cross members, a first cross member 54 extending between the forward faces of the two end wall portions 20 and 22. A second cross member 56 extends between opposite inner faces of end wall portions 20 and 22, this cross member having a generally V-shaped cross sectional configuration. Member 56 may either be made as a single member or two separate members if desired. A further cross member 58 extends between the opposing inner faces of end wall portions 20 and 22, member 58 having a substantially L-shaped cross sectional configuration.

The end wall portions as well as the several cross members may be formed of any suitable material such as fiberglass, sheet metal, wood, or a combination of wood and fiberglass if desired. The components may be secured together either by suitable adhesive or by other fastener means. In any event, the over-all arrangement of the container is such as to provide an open lightweight framework which may be manufactured in a very economical manner and yet which at the same time provides a very sturdy and rugged arrangement in use.

A first pair of guide means 60 and 62 are secured to the inner face of end wall portion 20, guide means 60 extending upwardly above the edge portion 24, and guide means 62 extending upwardly above the upper edge portion 28. A similar pair of guide means 64 and 66 are secured to the inner face of end wall portion 22, guide means 64 extending upwardly above upper edge portion 40 and guide means 66 extending upwardly above upper edge portion 44. These guide means at opposite ends of the container serve to properly align a unit which is stacked on the container and is supported on the upper edge portions of the opposite end wall portions thereof. It is apparent that when a unit is resting upon the upper edge portions of the container, the guide means 60, 62, 64 and 66 will engage the inner surfaces of the end wall portions of the supported unit so as to properly hold it in the operative position and maintain the edge portions of the end wall portions in proper alignment.

A plurality of support means are provided, the support means being indicated generally by reference numerals 70 and being shown as six in number. These support means are mounted upon the cross members 56 and 58 which serve to support the forward and rearward parts respectively of each support means. The support means may be fixedly mounted on these cross members by means of a suitable adhesive substance and the like. FIG. 4 illustrates the position of the container when a chicken as indicated in phantom line is loaded into the container, and FIG. 5 illustrates the normal position of the container during actual shipping. As seen in these figures, it will be noted that in both FIGS. 4 and 5 the support means is so positioned within the container that it slopes downwardly from the back to the front of the container such that the chicken will be supported within the support means such that the bird is also sloping downwardly in a forward direction so that its head is in a lower position than normal whereby the bird will be retained substantially immobile during actual shipping operations.

The construction of each of the support means is substantially identical, and one particular support means will be described in detail in connection with FIG. 2 of the drawings, this same description applying to each of the support means. The support means includes a unitary body portion formed of a suitable material such as polyethylene plastic or the like which is non-irritating to the bird. This support means is molded so as to have a particular configuration in accordance with the bird which it is desired to support.

As seen in FIG. 2, the body means of each support means is provided with a pair of depressions 72 and 74 at the opposite sides thereof for receiving the upper portion of the legs of the chicken, while a central depression 76 is provided for receiving the keel bone or breast area of the chicken.

A forward wall 78 is provided against which the clavicle of the chicken is adapted to rest, and a cutout rolled-over portion 80 is adapted to support the neck of the chicken and to allow the neck to extend forwardly of the support means as will be clear from an inspection of FIGS. 4 and 5. The rear edge of the support means is provided with a pair of depressions 82 which are adapted to receive the legs of the chicken which depend downwardly through these depressions.

As seen particularly in FIGS. 4, 5 and 6, a retaining means indicated generally by reference numeral 86 comprises a curved piece of resilient wire or the like which is looped at one end 88 thereof so as to be mounted upon a screw or the like 90 whereby the retaining means is pivotally supported from the undersurface of cross member 58. The opposite end portion of the retaining means is bent to be substantially U-shaped as seen in FIG. 6 and this U-shaped portion finally terminates in an upwardly directed portion 94 as seen in FIG. 4 which is adapted to move behind a depending wall portion 96 of the associated support means as seen in FIG. 6 for holding the retaining means in position. When it is desired to release the retaining means, the member 86 may be bent downwardly so as to release portion 94 from behind wall portion 96 so that it may be swung outwardly away from cross member 58 whereby the legs of the chicken may be either inserted or removed with respect to the depressions 82 provided in the rear portion of the support means.

It is evident that when the retaining means is in a latched position shown in FIG. 6, the legs of the chicken cannot be moved rearwardly of the support means a sufficient amount to allow the legs to be withdrawn, and accordingly the chicken is prevented from moving out of the support means. The upwardly directed portion 94 provides a means for readily latching the retaining means in its holding position as seen in FIG. 6 and also enables this retaining means to be readily unlatched when desired. A particular feature of the retaining means is the fact that it is of extremely simple construction and may be operated by one finger whereby personnel grasping the legs of a chicken can operate the retaining means without letting go of the legs of the chicken simply by moving the retaining means with one finger of the hand.

It is obvious that chickens may be very simply placed in operative position within the container simply by lowering the chicken into the phantom line position shown in FIGS. 4 and 5 whereupon the retaining means may be moved to the latched position shown in FIG. 6. The chickens are then ready for transport. The initial step in placing the containers in a stack on a vehicle such as a flat bed truck or the like is to place a leveling block 100 beneath the forward lower edge portion 56 of the container so as to elevate the forward portion of the container to the position shown in FIG. 5 wherein each of the surfaces 40, 42, 44 and 46 extend substantially horizontally.

Referring now to FIG. 8, a stack of containers is illustrated in position on a supporting surface 102 such as the bed of a truck and the like. As seen in this figure, a pair of adjacent stacks are provided, each of the stacks having a leveling block 100 beneath the lowermost container in the stack. The various containers are stacked on one another with the end wall portions of one another being in engagement, and the guide means serving to properly align the superposed containers. It will also be noted as seen in FIG. 8 that each container is in the reverse position to the adjacent container, or in other words the forward portion of one container is disposed adjacent to the rearward portion of the containers either thereabove or therebelow. In this manner, the containers may be nested together as illustrated whereby a very compact arrangement is provided and whereby a maximum number of containers may be positioned in a given space so as to increase the bird density for a certain amount of cubic space occupied on the transporting vehicle.

Referring now particularly to FIG. 7, a top filler unit is indicated generally by reference numeral 106, this unit including opposite end wall portions 108 and 110 which are joined at the opposite end portions thereof by cross members 112 and 114. A further pair of cross members or tie down bars 116 and 118 extend between the upper edge portions of the two end wall portions.

The lower edge portion of end wall portion 108 includes a pair of relatively short parallel surfaces 120 and 122 joined together by a sloping surface 124. In a like manner, the end wall portion 110 is provided with a pair of relatively short parallel edge portions 126 and 128 which are joined by a sloping edge portion 130. These edge portions formed on the undersurfaces of end wall portions 108 and 110 are complementary to the upper edge portions of the containers and are adapted to snugly fit thereupon.

Referring to FIG. 8, it will be noted that the filler units 106 are mounted upon the topmost containers in each stack, and suitable tie down means such as a rope 134 secured to a fitting 136 at the side of the vehicle extend upwardly over the tie down bars 116 and 118 whereby the stacks of containers may be held in place during the shipping operation.

It will of course be apparent that the top filler units are also of an open lightweight framework construction so as to provide the desired degree of strength and rigidity and at the same time permit free circulation of air throughout the stack of containers.

Referring now to FIGS. 9, 10 and 11, a modified form of the invention is illustrated wherein a vehicle for shipping live birds is illustrated. As seen in FIG. 10, the vehicle is indicated generally by reference numeral 150 and includes a cab portion 152 and a bed portion 154 upon which the track means is adapted to be supported. Four upstanding support members 155 are positioned at the four corners of the bed 154, and tracks 156 are supported in spaced relationship by means of cross members 157 which support opposite ends of the tracks, the support members 157 being supported between the upwardly extending support members 155 at the forward end of the bed and also at the rear end of the bed. It will be noted that the tracks 156 are supported in spaced relationship both vertically and horizontally with respect to one another, and the tracks in adjacent horizontal rows of tracks may be disposed in staggered relationship so as to permit the maximum number of birds to be supported within a given cubic space.

Each of the tracks as seen in FIG. 11 is of tubular configuration and has a generally rectangular cross sectional configuration, an elongated open slot 158 being provided in the top wall of each of the tracks. A plurality of bird support units are adapted to be slidably positioned within each of the tracks, the bird support units being movable into and out of the tracks for loading and unloading operations, the tracks and the bird support units comprising the sole means for retaining the live birds in operative position during shipment.

Referring now to FIG. 9, a bird support unit is illustrated and includes a base portion 150 which is adapted to be relatively snugly received within a track on the vehicle, the base portion preferably having rounded end portions so as to facilitate its movement into the end portion of the track. A pair of hook-like members 162 and 164 extend from opposite ends of the base portion for interconnecting the base portions, a hook member 162 lying substantially in a horizontal plane while hook member 164 lies substantially in a vertical plane. As seen in FIG. 11, this hook arrangement permits adjacent units to be hooked to one another and permits free pivotal movement therebetween.

An upstanding support 168 extends upwardly from the upper surface of base portion 160, and a support means 170 is supported upon portion 168 and fixed with respect thereto as by providing a suitable adhesive substance and the like. Support means 170 is identical with the support means 70 previously described, and accordingly it need not be described in detail. It is important to note, however, that the forward portion 172 of support means 170 is disposed below the rearward portion 174 thereof such that the support means 170 slopes downwardly approximately the same amount as does the support means 70 as seen in FIG. 5, whereby a bird supported within the support means will also slope in a downward direction to maintain the bird immobile during shipment. The support means illustrated in FIGS. 9 and 11 may also be provided with a suitable retaining means for holding the legs of the bird in place, and this retaining means 86' may be suitably pivotally supported to the undersurface of the support means.

Referring to FIG. 11, an extension track member 180 is indicated which is also of tubular construction and which may be substantially rectangular in cross sectional configuration, the upper wall thereof being provided with an elongated slot 182 formed therein. Extension track member 180 includes oppositely extending side wall portions 184 which are provided with downwardly facing slots 186 therein. These slots are adapted to receive pins 188 which extend outwardly from the outer end portions of each of the tracks provided on the vehicle so as to permit the extension track member to be mounted upon the tracks on the vehicle.

The extension track member is employed when it is desired to load or unload the vehicle, and the extension track member may be operatively associated with any one of the tracks on the vehicle. It is of course apparent that more than one track extension member may be employed if desired to load or unload more than one track on the vehicle at a time.

As seen in FIG. 11, a rope or cable 190 is provided with a hook member 192 at the outer end thereof which is adapted to engage the hook member 162 fixed to the base portion of one of the bird support units. It is apparent that by exerting a pull on member 190 in the direction of the arrow, the bird support units mounted within the track 156 may be drawn outwardly into the extension track member and thence can be moved into any desired location for loading or unloading as the case may be.

It is apparent with the arrangement as shown in FIGS. 9–11 inclusive that live birds may be loaded and unloaded in a most simple and effective manner, and the individual bird support units may be moved into operative position on the tracks of the vehicle simply by either pushing on one end of the chain of interconnected bird support units or by pulling on the other end thereof. The bird support units can of course be readily removed from the tracks on the vehicle by moving them in the opposite direction.

The birds will remain substantially immobile during shipping, and it is obvious that a very simple structure for supporting the birds in operative position is provided, and that the birds will receive ample air circulation and further will be protected from damage.

It is also apparent that since the various bird support units are pivotally interconnected with one another, they are adapted to traverse curves in the supporting track members such that the bird support units can be moved directly into a processing plant as desired.

It is apparent from the foregoing that there is provided according to the present invention new and novel apparatus for shipping live birds which supports the birds during shipping in such a manner as to minimize any physical damage thereto. The apparatus is so arranged as to facilitating loading as well as unloading of the birds thereby reducing the chance of physically damaging the birds and further minimizing the time and effort required to perform these operations. The apparatus holds the birds in such a position that they remain substantially immobile during transit. The arrangement affords improved air circulation as compared with prior art arrangements, and it is not necessary to provide fans or similar devices for circulating air toward the center portion of the space within which the birds are supported. The container of the present invention provides an arrangement wherein the weight per bird is substantially less than prior art arrangements, and further wherein the container has a much greater life expectancy than conventional containers now employed in the art. Applicant's arrangement also affords greater bird density on a truck to thereby increase the truck capacity. This is true not only of the manner in which the containers may be stacked upon a vehicle, but it is also true of the vehicle modification illustrated in FIGS. 9–10 of the drawings. The arrangement of the present invention is quite simple and inexpensive in construction, and yet is quite rugged and sturdy and efficient and reliable in operation although of a very lightweight construction. The novel transport vehicle of the present invention provides a means for supporting a large number of birds in a relatively compact space and in particular provides an arrangement which greatly facilitates loading and unloading of a large number of birds on a vehicle.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Apparatus for shipping live birds comprising a container, a bird support means having forward and rear end portions supported by said container for receiving and supporting a live bird, said support means being disposed in a permanently fixed relationship with respect to said container such that the support means is positioned to slope downwardly from the rear end portion to the forward end portion when the container is in normal operative shipping position whereby a bird supported thereby is held in a position such that it is sloping downwardly with its head below its normal position, and means adjacent said rear end portion for directing a bird's legs in a downwardly extending position so as to hold the bird substantially immobile during shipment.

2. Apparatus for shipping live birds comprising a container defining an open lightweight framework, a bird support means supported on said framework in permanently fixed relationship to said container, said support means being adapted to receive and support a live bird thereon, the support means being positioned to slope downwardly when the container is in its normal operative shipping position so as to support a bird such that it is sloping downwardly when being shipped to retain the bird in immobile position, and leg retaining means movably supported by said framework and cooperating with said support means for holding the legs of a bird in place with respect to said support means.

3. Apparatus for shipping live birds comprising a container of open lightweight framework construction being open at the top and bottom thereof, said framework including a front portion and a rear portion, support means for receiving and supporting a live bird, said support means being disposed in fixed supported relationship on said framework, said support means being contoured to fit the underside of a live bird to prevent damage thereto and to support a substantial area of the underside of a live bird, said support means being normally positioned so as to slope downwardly from the back to the front of the container when the container is in normal operative shipping position so as to hold a bird in position such that it is sloping downwardly to retain the bird in immobile position during shipment, and retaining means movably supported by said container and adapted to cooperate with said support means to hold the legs of a bird in place during shipment.

4. Apparatus for shipping live birds comprising a container, said container including a pair of end wall portions joined together by cross members so as to define an open lightweight framework open at the top and bottom thereof, a plurality of spaced support means supported on said cross members, each of said support means being contoured to fit the undersurface of a live bird and to support a relatively large area of such undersurface of a live bird to prevent damage during shipment, said support means being disposed in fixed relationship to said container and being positioned to slope downwardly when the container is in normal operative shipping position so as to support a bird so that it is sloping downwardly to retain the bird immobile during shipment, and retaining means movably supported by said container and cooperating with each of said support means so as to hold the legs of a bird in place during shipment and to prevent the birds from leaving the support means.

5. Apparatus as defined in claim 4 including means for selectively latching said retaining means in operative holding position and for releasing the retaining means from holding position when desired.

6. Apparatus for shipping live birds comprising a container, said container including a pair of opposite end wall portions, cross member means joining said end wall portions, said end wall portions and cross members means defining an open light weight framework which provides ready access to the container, a plurality of support means supported at spaced points along said cross member means and disposed in fixed relationship thereto, each of said support means being contoured to fit the undersurface of a live bird and defining a relatively large surface to support a relatively large area of the undersurface of a bird, said support means being positioned so as to slope downwardly when the container is in normal operative position to support a live bird such that it is sloping downwardly to retain it immobile during shipment, retaining means movably supported by said container and being disposed adjacent each of said support means for cooperating therewith to hold the legs of a bird in place when the bird is supported within said support means, and means for latching said retaining means in holding position during shipment.

7. Apparatus as defined in claim 6 wherein each of said end wall portions has supported thereon guide means for properly operatively positioning an adjacent container relative thereto when a plurality of containers are stacked upon one another.

8. Apparatus as defined in claim 6 wherein said end wall portions include a back and a front portion, said end wall portions being generally tapered from the back portion thereof toward the front portion thereof so as to save space and permit stacking of a plurality of containers one upon another along the end wall portions thereof.

9. Apparatus for shipping live birds comprising a container having a pair of opposite end wall portions joined by a plurality of cross members, said container including a back portion and a front portion, guide means supported by each end wall portion and extending above the upper edge thereof so as to align a next adjacent unit when supported on the end wall portions thereof, said end wall portions being generally tapered from the back of the continer toward the front of the container to save space and to permit stacking of a plurality of containers one upon another, a plurality of support means supported at fixed positions along said cross members, each of said support means being contoured to fit the undersurface of a live bird and defining a relatively large area so as to prevent damage to the bird during shipment when supported on said support means, said support means being disposed in fixed relationship to the container and being positioned so as to slope downwardly from the back of the container toward the front of the container when the container is in normal operative position so as to support the bird such that it is sloping downwardly during shipment so as to retain the bird immobile during shipment, and a plurality of of retaining means pivotally supported by one of said cross members, each of said retaining means being operatively positioned adjacent one of said support means and being movable into a holding position to hold the legs of a bird supported in the support means in place and to prevent the bird from leaving the support means, and means for latching the retaining means in operative holding position and to permit selective release when desired.

10. Apparatus for shipping live birds comprising a plurality of containers disposed in stacked nested relationship with respect to one another, each of said containers comprising an open lightweight framework including a pair of opposite end wall portions, cross member means joining said end wall portions of each container, a bird support means supported by said container, said bird support means being positioned to slope downwardly when the container is in its normal operative shipping position so as to support a bird such that it is sloping downwardly when being shipped to retain the bird in immobile position, leg retaining means movably supported by said container and cooperating with said support means for holding the legs of a bird in place with respect to said support means, each of said containers including guide means operatively supported by each of the end wall portions thereof for aligning an adjacent unit, each of said end wall portions including a back portion and a front portion with the end wall portions being generally tapered from the back portion to the front portion thereof, all of said stacked containers except the bottommost container being supported on the end wall portions of the container immediately therebelow, each of said containers being in reverse position to the container either thereabove or therebelow so that the front portions of one container are adjacent to the back portions of the adjacent container.

11. Apparatus as defined in claim 10 including means for supporting the front end portion of the lowermost container of the stack of containers so as to position said lowermost container in operative shipping position.

12. Apparatus as defined in claim 10 including a filler unit supported on the end wall portions of the uppermost container of the stack of containers, said filler unit including tie-down cross members so as to permit the entire stack of containers to be readily tied down to the bed of a vehicle or the like.

13. Apparatus as defined in claim 10 wherein the side wall portions of each of said containers except the lowermost container of the stack of containers engages the guide means of the container therebelow so as to properly operatively position the containers one upon another.

14. Apparatus for shipping live birds comprising a vehicle having track means supported thereon, a plurality of bird support units, each of said bird support units including a base portion movably supported by said track means, said bird support units being operatively connected with one another, and support means supported above each of said base portions, said support means being contoured to fit the undersurface of a bird and support a relatively large area thereof with the legs of the bird downwardly directed from the rear portion thereof, said support means being positioned so as to slope downwardly when the unit is in normal operative shipping position so as to support the bird in a position sloping downwardly so as to retain the bird immobile during shipment.

15. Apparatus as defined in claim 14 wherein said track means includes a plurality of separate and independent tracks spaced both vertically and horizontally with respect to one another, and each of said tracks being adapted to receive an extension track so as to permit ready loading and unloading of the tracks.

16. Apparatus as defined in claim 14 wherein each of the bird support units supported by said track means is pivotally connected with an adjacent bird support unit so as to permit the units to be readily moved into and out of operative shipping position on said track means.

References Cited by the Examiner

UNITED STATES PATENTS

| | | | |
|---|---|---|---|
| 478,930 | 7/1892 | Ewert | 119—19 |
| 2,122,731 | 7/1938 | Summers | 119—97 |
| 2,564,630 | 8/1951 | Thorman | 17—44.1 |
| 2,611,338 | 9/1952 | Yellin | 119—17 |
| 2,616,558 | 11/1952 | Kay | 206—45.13 |
| 2,674,226 | 4/1954 | Manning | 119—48 |
| 2,946,309 | 7/1960 | Page | 119—18 X |
| 3,011,477 | 12/1961 | Bressler et al. | 119—18 X |
| 3,119,375 | 1/1964 | Ernst | 119—48 |
| 3,164,129 | 1/1965 | Rigterink | 119—45 |

SAMUEL KOREN, *Primary Examiner.*

ALDRICH F. MEDBERY, *Examiner.*